Patented Apr. 24, 1934

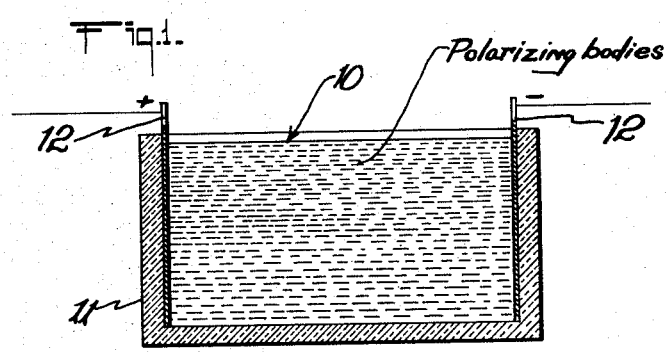
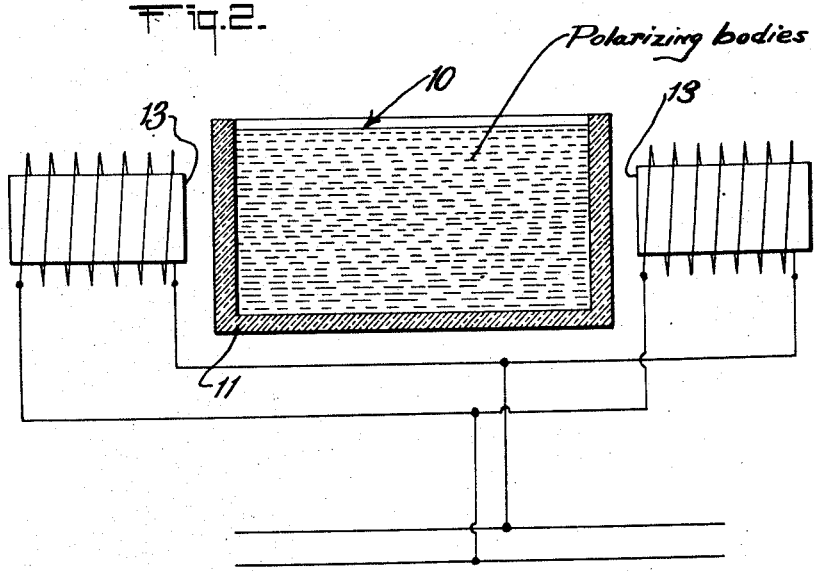

1,955,923

UNITED STATES PATENT OFFICE 1,955,923

LIGHT VALVE AND METHOD OF OPERATION

Edwin Herbert Land, Cambridge, Mass.

Application August 11, 1932, Serial No. 628,431

14 Claims. (Cl. 88—61)

This invention relates to a method for controlling radiation and apparatus therefor, and more specifically to a method for controlling the passage of radiation through a material medium by the application of an electrically controlled field of force to said medium.

In general, it is an object of the invention to provide a method which will efficiently perform the purpose toward which it is directed and a device which is simple and economical of construction, which can be expeditiously and conveniently manipulated and which can be readily manufactured and assembled.

Another object of the invention is to provide a device, the transmissivity of which in a given direction is a function of a field of force applied in that direction and which has means for setting up such an electrically controlled field which do not substantially impair electro-magnetic propagation.

Another object is to provide a device which, when subjected to an electrically controlled field of force, will become more pervious to radiation.

Another object is to provide a device which, when subjected to an electrically controlled field of force, will polarize radiation passing therethrough.

Another object is to provide a device which, when subjected to an electrically controlled field of force, will polarize radiation passing therethrough in one direction and will become more permeable to radiation in another direction.

Other objects of the invention will in part be obvious and will in part appear hereinafter.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention, reference should be had to the following detailed description taken in connection with the accompanying drawing which illustrates in cross-section two forms of the invention.

In many physical-engineering problems it is necessary that a certain result shall become apparent almost immediately upon the arising of certain casual circumstances. Intermediary devices in most cases have inertia, the overcoming of which brings in a delaying time factor. The effect upon the properties of the transmitted radiation of a field of force applied to a light-transmitting medium such as here described, is almost instantaneous. There are occasions when it is desirable to utilize radiation passing in the direction in which a field is to be set up and it is inconvenient to have the radiation absorbed by the means which set up the field and which, being electrically conducting, are not optically transparent. The present invention contemplates a method and a device adapted to be used in connection therewith, which uses the interaction of magnetic and/or electric fields, magnetically and electrically susceptible media and electromagnetic oscillations propagated therethrough, whereby a given phenomenon may give rise to other phenomena without intermediate inertial delays. The device also has electrodes so disposed that they but slightly absorb light in the path of which they lie.

In the co-pending application of Edwin H. Land, Serial No. 434,833, filed in the United States Patent Office on March 10, 1930, there is described a medium bearing polarizing bodies, which may be caused to polarize light. In one form of the present device it is proposed to use such a medium, but not to allow it to become set. This medium may comprise a cellulose ester and/or an acetate, and forms with the bodies a suspension. The bodies may have a dimension shorter than the wave-length of the light used.

The polarizing bodies here preferably employed are relatively small crystals which are dichroic and transparent, and can be produced commercially in large quantities with substantial uniformity of size and other properties. The polarizing bodies are preferably of such size and shape, particularly when molecular bombardment is relied upon as the disorienting force, as to show a Brownian movement when suspended in a suitable light-transmitting medium. It is generally desirable to employ colorless crystals, for example, small crystals of herapathite (sulphate of iodo-quinine).

The crystals thus dispersed throughout the medium have initially substantially all orientations and form, in the first instance, an opaque mass.

In general, the method of the invention comprises placing the suspension, numeral 10 in the drawing, having properties similar to those described above, in a container 11 which is transparent to beams of light of such wave-lengths as it is desired to use, and setting up a field of force, such as an electric field, within the medium. The crystals to be used should have some physical property which is susceptible to the field of force to be applied. When a magnetic field is employed the crystals turn or rotate in the suspension so that their polarizing axes tend to orient similarly. In like manner, in the electric field, the crystals turn so that their polarizing axes tend to orient similarly.

In the cases where one crystal axis is relatively long compared to another, it is possible after the axes have been aligned to transmit light through the medium between the crystals in the direction of the long axis. Each of the crystals is preferably at least partially opaque and whether or not the crystals have the added polarizing property is immaterial. Any suspension of asymmetric relatively opaque bodies susceptible to the field may be employed. Thin and/or needle-like bodies are preferred. Thus in the arrangement shown in the drawing a beam of light in the plane of the paper and perpendicular to the electrodes would pass through the electrodes and the medium and between the bodies. If polarizing bodies are used they may be individually transparent, but in a heterogeneously-oriented group they do not transmit light.

When the crystals also have the ability to polarize, the unoriented suspension is opaque, but upon the aligning of the crystals the polarizing axis may simultaneously be aligned with the result that light may pass perpendicularly to the field (or perpendicular to the paper as shown in the drawing) through the medium and through the crystals. In such a case the transmitted light is polarized and has an intensity relative to the incident light which depends upon the strength of field.

The electrodes are made preferably but slightly opaque when light is to be transmitted along the field. A preferred form is a metallic film, for example, a film of platinum 12 sputtered on the container 11 or a transparent base. Another form comprises a conducting mesh. The potential may be applied in various strengths to obtain various effects.

It may be desirable to use a magnetic or electro-magnetic field instead of an electric field. In Fig. 2 is illustrated a light valve embodying the invention, which comprises a suitable container 11 and a suspension 10 of polarizing particles susceptible to a magnetic field suspended in a suitable light-transmitting medium. An electromagnet 13 is shown positioned so as to set up a magnetic field across the suspension when the coils of the magnet are energized.

The use of the present device as a light valve or in conjunction with other apparatus therefor in connection with television and other modern problems is contemplated. For example, electrical fluctuations of exceeding rapidity received at a television-receiving station may be impressed upon the electrode of the device with the result that the suspension oscillates between opacity and transparency at a similar rate. The intensity of a beam of light is thus governed with precision. Under certain conditions the light passes between the aligned suspended bodies and under others polarized light passes through the aligned suspended bodies. In the latter case when the bodies are not aligned by the force between the electrodes one body cuts off what another body transmits and the whole appears opaque.

Since certain changes in carrying out the above process and in the constructions set forth, which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

Having described my invention, what I claim as new and desire to secure by Letters Patent, is:

1. A light valve comprising a light-transmitting fluid-suspending medium having a dispersed suspension of polarizing particles therein showing Brownian movement and susceptible to an electrically controlled field of force, and means adapted for applying such a field to said particles, whereby their polarizing axes tend to align.

2. A light valve comprising a light-transmitting fluid-suspending medium having a dispersed suspension of asymmetric polarizing particles therein showing Brownian movement and susceptible to an electrically controlled field of force, and means adapted for applying such a field to said particles whereby the polarizing axes of said particles tend to align.

3. A light valve comprising a light-transmitting fluid suspending medium, a dispersed mass of crystals of herapathite movable therein and showing Brownian movement, and means adapted for applying an electrically controlled field of force to said crystals.

4. A light valve comprising a light-transmitting fluid suspending medium, a dispersed mass of polarizing bodies movable therein and showing Brownian movement, and means adapted for applying an electric field of force to said bodies, said polarizing bodies being of such a nature that their polarizing axes tend to orient in parallelism when said field of force is applied.

5. A light valve comprising a light-transmitting fluid-suspending medium, a mass of polarizing bodies therein showing Brownian movement, and means adapted for applying a magnetic field of force to said bodies whereby their polarizing axes tend to align.

6. A light valve adapted to vary the intensity of a transmitted beam comprising a light-transmitting fluid medium containing a cellulose ester and a dispersed suspension of dichroic crystals showing Brownian movement, and means adapted for applying an electrically controlled field of force to said crystals whereby the polarizing axes of said crystals tend to align.

7. A light-transmitting light valve, comprising a fluid medium containing an acetate and a dispersed suspension of dichroic crystals showing Brownian movement, and means adapted for applying an electrically controlled field of force to said crystals whereby the polarizing of said crystals tend to align.

8. A light valve, comprising a fluid medium containing cellulose nitrate and a mass of herapathite particles, and means adapted for applying an electric field to said particles.

9. A light valve, comprising a fluid medium containing cellulose nitrate and a mass of herapathite particles having a dimension shorter than the wave-length of the light used, and means adapted for applying an electric field to said particles.

10. A light valve adapted to vary the intensity of a transmitted beam, comprising a plurality of electrodes adapted to permit light to pass through, a light transmitting fluid suspending medium within the field of a potential difference applied across said electrodes, and a dispersed mass of asymmetric polarizing particles, showing Brownian movement, susceptible to said field and movable in said medium under the influence of said field so that their polarizing axes tend to align.

11. A light valve, comprising a plurality of substantially transparent elements, a substantially transparent film of conducting material sputtered thereon, a light-transmitting fluid suspending medium within the field of a potential applied to said films, and a dispersed suspension of polarizing bodies, showing Brownian movement, and susceptible to said field and movable in said medium under the influence of said field whereby their polarizing axes tend to align.

12. A light valve, comprising a plurality of substantially transparent elements, a substantially transparent film of conducting material sputtered thereon, a light-transmitting fluid suspending medium within the field of a potential applied to said films and a dispersed suspension of herapathite crystals, showing Brownian movement, and movable in said medium under the influence of said field whereby their polarizing axes tend to align.

13. The method of variably intercepting more or less of a beam of light, which comprises passing the beam through a dispersed mass of polarizing particles suspended in a light-transmitting medium, and applying to said particles an electrically controlled field of force whereby the absorption of the beam within the suspension may be altered.

14. The method of variably intercepting more or less of a beam of light, which comprises interposing in the path of said beam a dispersed suspension of polarizing particles in a light-transmitting medium, and applying to said suspension an electrically controlled field of force to vary the transparency of the suspension.

EDWIN HERBERT LAND.